March 17, 1925.  
R. F. HOFFMAN ET AL  
1,529,889  
ELECTRICALLY OPERATED TAXIMETER CONTROL  
Filed July 12, 1924　2 Sheets-Sheet 1

INVENTOR  
Ronald F. Hoffman  
Harry J. Erickson  
BY  
Fred C. Matheny  
ATTORNEY March 17, 1925.
R. F. HOFFMAN ET AL
1,529,889
ELECTRICALLY OPERATED TAXIMETER CONTROL
Filed July 12, 1924  2 Sheets-Sheet 2
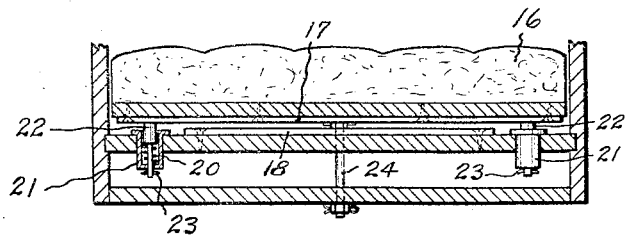
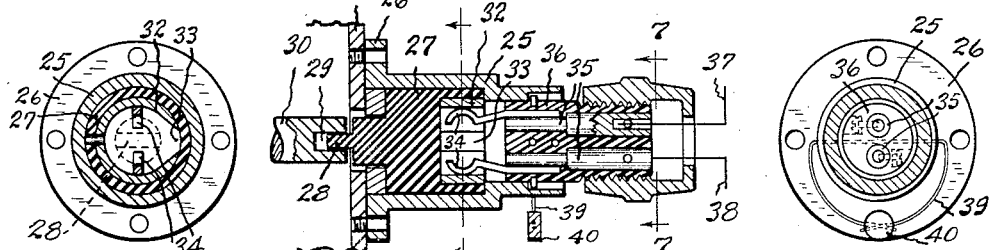
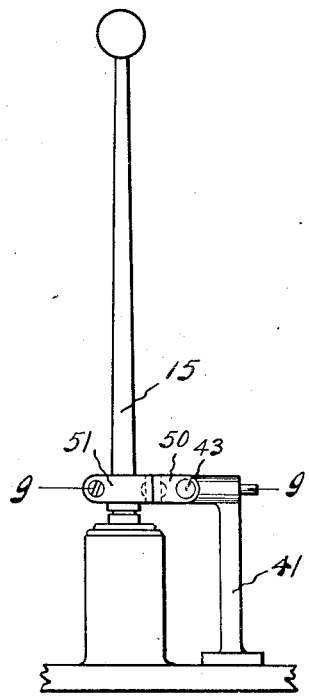
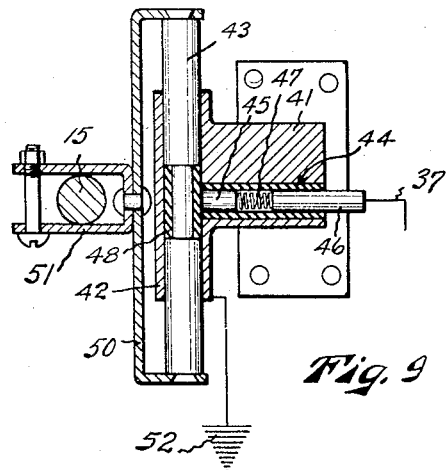
INVENTORS
Ronald F Hoffman
Harry J Erickson
BY
Fred C Matheny
ATTORNEY Patented Mar. 17, 1925.

1,529,889

UNITED STATES PATENT OFFICE.

RONALD F. HOFFMAN AND HARRY J. ERICKSON, OF SEATTLE, WASHINGTON, ASSIGNORS TO HOFFMAN SYSTEM INC., OF SEATTLE, WASHINGTON, A CORPORATION OF WASHINGTON.

ELECTRICALLY-OPERATED TAXIMETER CONTROL.

Application filed July 12, 1924. Serial No. 725,665.

*To all whom it may concern:*

Be it known that we, RONALD F. HOFFMAN and HARRY J. ERICKSON, citizens of the United States, residing at Seattle, in the county of King and State of Washington, have invented a certain new and useful Improvement in Electrically-Operated Taximeter Controls, of which the following is a specification.

Our invention relates to improvements in electrically operated taximeter controls for use on for hire vehicles as taxicabs and the object of our invention is to provide a device that will make it impossible to operate a taxicab when the rear seat is occupied by a passenger unless the taximeter of said taxicab is in recording position.

Another object is to provide devices of this nature for installation in connection with the rear seat and the taximeter and the gear shifting means of a taxicab that will make it impossible to start the engine or that will stop the engine if the vehicle driving gears are shifted into an operative or driving position when the rear seat is occupied and the taximeter is in a non-recording position but that will not interfere with the starting or running of the engine if the gears are in neutral, the rear seat occupied and the taximeter in a non-recording position, said devices being totally inoperative to stop the engine when the rear vehicle seat is not occupied or when the taximeter is in a recording position or when the gearshift lever is in neutral.

Further objects are to provide devices of this nature that are comparatively cheap and simple in construction, that are easy to install on standard types of taxicabs with very little alteration of the usual taxicab parts and that are accurate and reliable in operation and not easy to tamper with.

Other and more specific objects will be apparent from the following description taken in connection with the accompanying drawings.

In the operation of taxicabs or for hire vehicles it is possible, with taximeters of the usual form, for hired drivers to transport passengers with the taximeter in non-recording position, collect the fares from passengers and not make any accounting to the owner of the taxicab or for hire vehicle.

This evil is partly overcome by providing taximeters that always register the total distance the taxicab is driven and, that, in addition, can be set to register the distance covered while carrying passengers, and by allowing the driver a certain amount of mileage called dead mileage, usually half of the total distance registered, for which he is not required to make an accounting. Even when this is done it is yet possible for the driver to defraud the owner when he is able to procure passengers for more than half of the distance he is required to drive; For instance if a driver transports a passenger to a distant point and properly records the trip he is entitled to dead mileage equal to the distance back to his starting point. If he can obtain a passenger for the return trip he can often set the taximeter in non-recording position and collect a fare from the last mentioned passenger for which he makes no accounting.

Our present invention makes it impossible for the driver to use the taxicab for transporting passengers without making a complete record of all trips.

In the drawings Figure 1 is a view in side elevation of a taxicab on which our invention is installed, the arrangement of parts constituting the invention being indicated by dotted lines.

Figs. 3 and 4 are sectional detail views of a rear seat switch construction embodied in the invention.

Fig. 5 is a longitudinal sectional view through a taximeter switch.

Figs. 6 and 7 are cross sectional views of the same on broken lines 6—6 and 7—7 respectively of Fig. 5.

Fig. 8 is a view in elevation of a gear shift lever having a switch constructed in accordance with our invention.

Fig. 9 is a sectional view of the switch on a larger scale on broken line 9—9 of Fig. 8.

Figures 3, 10:
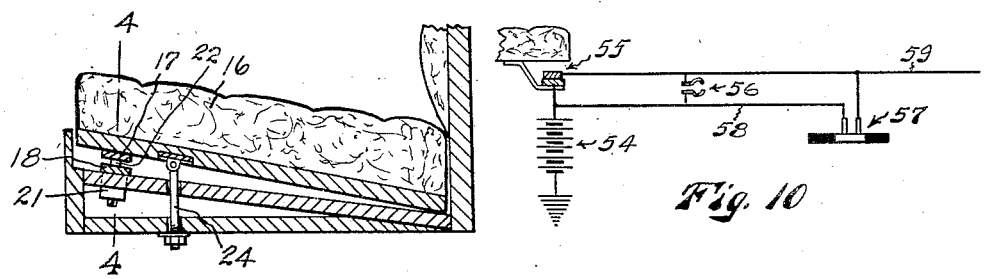

Fig. 10 is a diagrammatic view showing a modification of the invention for use in connection with a battery type of ignition.

Like reference numerals designate like parts throughout the several views.

Figure 1:
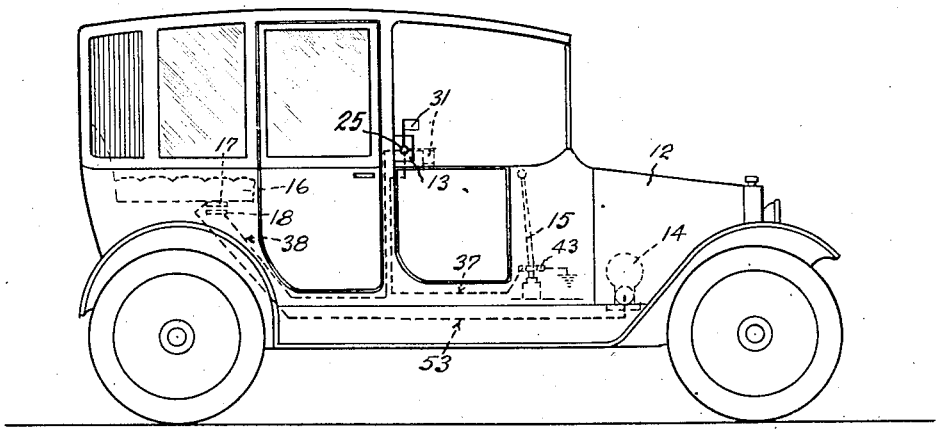

In the drawings 12 designates a taxicab having the usual taximeter 13 and having the usual magneto 14, gear shift lever 15 and rear seat 16 all shown in Fig. 1 by broken lines.

Our invention consists in providing with each the gear shift lever 15, the taximeter 13 and the rear seat 16 an electric switch and by using these three switches jointly to control the supply of current for ignition purposes to the engine of the taxicab.

In the preferred form of the invention shown in Figs. 1 to 9 inclusive we provide means for closing a circuit and grounding the magneto 14 under certain circumstances to stop the engine but if current for ignition purposes is supplied by a battery or generator the same result may be accomplished by breaking the ignition circuit.

The switch used in connection with the rear vehicle seat 16 comprises two bars 17 and 18 secured respectively to the bottom of the seat or cushion 16 and to the frame that supports the cushion and extending substantially across the seat. Springs 20 in guide tubes 21 are arranged to exert an upward pressure on stud bolts 22 that are secured to upper contact bars 17 thus keeping seat member 16 raised and contacts 17 and 18 separated except when there is a weight on seat 16. Cross pins 23 are provided in the bottom ends of stud bolts 22. One of the spring devices is preferably provided near each end of the seat as shown in Fig. 4 and a retaining bolt 24 may be provided near the middle of the seat if desired.

The taximeter switch that is adapted to be connected with the taximeter, Figs. 5, 6, and 7, embodies a housing 25 having end flange 26 adapted to be secured to the wall of the taximeter 13. Rotatably disposed within the housing 25 is a plug 27 of insulating material having an inner end of reduced size that projects outwardly beyond the end of housing 25 and terminates in a flat portion 28, see dotted lines Fig. 6, that is arranged to project into a slot 29 in the end of a shaft 30 in the taximeter upon which shaft 30 is secured a flag member 31 that is arranged to be moved from the position shown by dotted lines to the position shown by full lines Fig. 1, to turn shaft 30 and set the taximeter either in a recording or non-recording position, one position of the flag 31 being a recording position and the other a non-recording position for the taximeter.

The other end of plug 27 is bored for the reception of a contact segment 32 of arcuate shape which is less than a complete circle leaving a space 33 between the two ends thereof.

The contact members 34, secured to terminal posts 35 that are embedded in a plug 36 of insulating material project into the contact segment 32 and make contact therewith at diametrically opposite points.

Electric circuit wires 37 and 38 are electrically connected with terminal posts 35.

Unauthorized removal of plug 36 from housing 25 may be prevented by passing a wire 39 through suitable perforations in housing 25 and plug 36 and securing the two ends of the wire by a seal 40.

When the taximeter is in a non-recording position contacts 34 will both engage contact segment 32 and this switch will be closed, but when taximeter 16 is in recording position one contact 34 will rest on insulation plug 27 and switch will be open.

The switch used in connection with gear shift lever 15 and shown in Figs. 8 and 9 comprises a bracket 41 having a tubular guide 42 for reciprocably supporting a contact bar 43 and having a bore, at right angles to guide 42, lined with insulating material 44 and wherein are disposed two contact members 45 and 46 separated but electrically connected by a compression spring 47. Contact bar 43 has a short section 48 of insulating material about mid way of its length and is connected by brackets 50 and 51 with the gear shift lever 15, the bracket 51 affording sufficient clearance to permit the usual sidewise movement of the gear shift lever and the contact bar being arranged to be moved lengthwise by forward and rearward movement of the gear shift lever. When gearshift lever 15 is in the neutral position contact 45 will rest on sleeve 48 and the circuit to ground 52 will be broken but when lever 15 is moved forwardly or rearwardly to shift the vehicle driving gears into driving relation the circuit from wire 37 to ground 52 will be completed.

Figure 2:
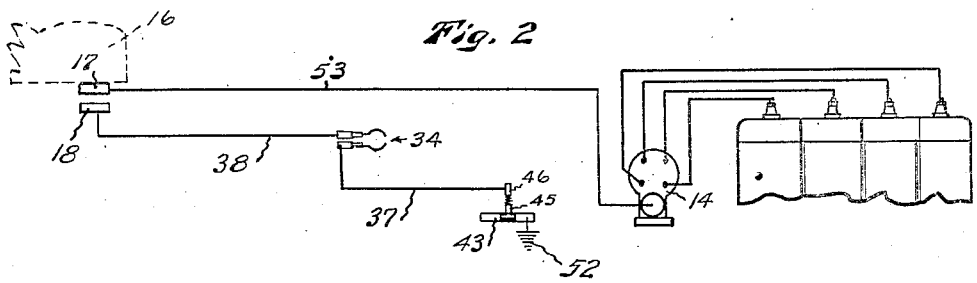
Fig. 2 is a wiring diagram showing a preferred embodiment of the invention.

Referring to Fig. 2, it will be seen that contact 46 of the gear shift switch is connected by wire 37 with one contact 34 of the taximeter switch; that the other contact 34 of taximeter switch is connected by circuit wire 38 with seat switch contact 18 and that the other seat switch contact is connected by circuit wire 53 with magneto 14.

In the operation of this device it is necessary that all three of the switches above described be closed to ground the magneto and stop the engine. If the rear seat is not occupied the switch 17—18 will always be open; if the taximeter is in the recording position the taximeter switch will always be open: If the gear shift lever is in neutral the switch operated thereby will always be open. But if a passenger occupies the rear seat 16 closing the switch 17—18 and the taximeter switch is closed by leaving the taximeter in non-recording position then as soon as the driver shifts his gears into driving relation the gearshift switch will be closed, the circuit from ground 52 to magneto 14 completed and the engine stopped.

It is very desirable that one switch be connected with the gearshift devices so that it will render the control inoperative to stop the engine when the gears are in neutral thus making it possible to idle the engine regardless of the condition of the rear seat or taximeter switch.

Fig. 10 shows an arrangement for use on a taxicab in which the engine is supplied with current from a battery 54. In this arrangement we provide a seat switch 55 arranged to be closed when the rear vehicle seat is not occupied and open when said rear vehicle seat is occupied; a taximeter switch 56 arranged to be open when the taximeter is in non-recording position and closed when the taximeter is in recording position and a gear shift switch 57 arranged to be closed when the vehicle driving gears are in neutral and open when said vehicle driving gears are in a driving relation. One terminal of each switch 55, 56 and 57 is connected by circuit wire 58 with the battery 54 and the other terminal of each switch is connected with a circuit wire 59, through which current flows to the engine, not shown.

In the operation of this device when any one of the switches 55, 56 or 57 is closed current will be supplied for ignition purposes but if the rear vehicle seat switch is opened by the weight of a passenger and the taximeter is left in non-recording position then the shifting of the gears into driving relation will open the switch 57 and shut off the flow of current for ignition purposes until the taximeter is moved into the recording position.

The foregoing description and accompanying drawings clearly disclose a preferred embodiment of our invention but it will be understood that this disclosure is merely illustrative and that numerous changes may be resorted to within the scope and spirit of the following claims.

We claim:

1. The combination with a for hire motor vehicle having the usual passenger seat, taximeter, gear shifting means and ignition devices, of switches connected respectively with said seat, said taximeter and said gear shifting means, and an ignition circuit controlled jointly by said switches.

2. The combination with a for hire motor vehicle having the usual passenger seat, taximeter, gear shifting means and ignition devices, of an ignition circuit, and switches in said ignition circuit connected respectively with said seat, said taximeter and said gear shifting means, for interrupting the flow of current for ignition purposes to the engine of the vehicle when said seat is occupied and said gear shifting means is in an operative position unless said taximeter is set in a recording position.

3. The combination with a for hire motor vehicle having the usual passenger seat, taximeter, gear shifting means and ignition devices, of an ignition circuit, and switches in said ignition circuit connected respectively with said seat, said taximeter and said gear shifting means, said switches serving, when said passenger seat is occupied and said gear shifting devices are in driving position, to permit the flow of current for ignition purposes to the engine only when said taximeter is in recording position.

4. The combination with a for hire motor vehicle having the usual passenger seat, taximeter, gear shifting means and ignition devices, of an ignition circuit, and switches in said ignition circuit connected respectively with said seat, said taximeter and said gear shifting means, said switches serving, when said passenger seat is occupied and said taximeter is in non-recording position, to interrupt the flow of ignition current to the vehicle engine unless said gear shifting means is in a neutral position.

5. An apparatus of the class described for controlling the setting of a taximeter, the combination with an ignition circuit including a seat operated switch and a taximeter operated switch, of a switch operated by gear shifting means for rendering both said seat switch and said taximeter switch inoperative to change the condition of said ignition circuit when said gear shifting means is in a neutral position.

6. In combination, a motor vehicle, a motor vehicle seat, a seat switch operated by the weight of a passenger on said seat, a taximeter, a taximeter switch governed by the setting of said taximeter in either recording or non-recording position, a gear shifting device, a gear shift switch governed by movement of said gear shifting device into either a neutral or driving positions, and an ignition circuit connected with said three switches and arranged to be rendered inoperative to supply current for ignition purposes to the engine of the vehicle if said gear shifting devices is moved into a driving position when said vehicle seat is occupied and said taximeter is in non-recording position.

7. The combination with a taxicab having the usual rear passenger seat, taximeter gear shift lever and ignition devices, of a seat switch operated by the weight of a passenger on said rear seat, a taximeter switch operated by movement of the flag of said taximeter between recording and non-recording positions, a gearshift switch operated by movement of said gear shift lever, between the neutral and any driving position, and an ignition circuit connected with said ignition devices and said three switches and the engine of the vehicle and arranged to be rendered inoperative by the simultaneous occupation of said rear seat, setting of said taximeter in non-recording position and setting of said gear shift lever in driving position.

8. In combination a motor vehicle having a seat and a taximeter and gear shifting devices and magneto means for supplying current for ignition purposes to the engine of the vehicle, of a ground circuit connected with said magneto, a switch in said ground circuit arranged to be closed by the weight of an occupant on said seat, another switch in said ground circuit connected with said taximeter and arranged to be closed when said taximeter is in non-recording position and another switch in said ground circuit connected with said gear shift means and arranged to be closed by the shifting of said gearshift means into a driving position.

9. In combination a motor vehicle, a seat, a seat switch arranged to be closed by weight on said seat, a taximeter, a taximeter switch arranged to be closed by the setting of said taximeter in non-recording position, a gear shifting device, a gear shift switch arranged to be closed by moving said gear shifting device into a driving position, a magneto, and a ground circuit connecting said magneto in series through said three switches to a ground.

RONALD F. HOFFMAN.
HARRY J. ERICKSON.